United States Patent
Koshelev et al.

(10) Patent No.: US 8,738,638 B1
(45) Date of Patent: May 27, 2014

(54) MAP USAGE VISUALIZATION

(75) Inventors: Eugene Koshelev, Zürich (CH); Jaroslav Bengl, Oberrieden (CH)

(73) Assignee: Google Inc., Mountain View, CA (US)

( * ) Notice: Subject to any disclaimer, the term of this patent is extended or adjusted under 35 U.S.C. 154(b) by 190 days.

(21) Appl. No.: 13/081,464

(22) Filed: Apr. 6, 2011

(51) Int. Cl.
G06F 17/40 (2006.01)

(52) U.S. Cl.
USPC .......... 707/751; 707/603; 707/688; 701/532; 702/187

(58) Field of Classification Search
USPC ............ 707/603, 688, 751; 701/532; 702/187
See application file for complete search history.

(56) References Cited

U.S. PATENT DOCUMENTS

| | | | |
|---|---|---|---|
| 6,882,853 B2 * | 4/2005 | Meyers | 455/457 |
| 2005/0174351 A1 * | 8/2005 | Chang | 345/440 |
| 2007/0100824 A1 * | 5/2007 | Richardson et al. | 707/7 |
| 2008/0262925 A1 * | 10/2008 | Kim et al. | 705/14 |
| 2008/0270468 A1 * | 10/2008 | Mao et al. | 707/104.1 |
| 2010/0197318 A1 * | 8/2010 | Petersen et al. | 455/456.1 |
| 2011/0145228 A1 * | 6/2011 | Laurenzo et al. | 707/723 |

OTHER PUBLICATIONS

Radanovic (WO 2009/080300).*

* cited by examiner

Primary Examiner — Hosain Alam
Assistant Examiner — Bruce Witzenburg
(74) Attorney, Agent, or Firm — Marshall, Gerstein & Borun LLP (57) ABSTRACT

A system and method determines analyzes usage of an online mapping system by users, determines popularity of geographic regions and stores the processed data which is optionally in a visual data layer over the map.

14 Claims, 11 Drawing Sheets

MAP USAGE VISUALIZATION

BACKGROUND OF THE INVENTION

1. Field of the Invention

The present invention is related to mechanisms of organizing and processing map usage data.

2. Description of the Background Art

Online maps provide geographically related information for many different features (e.g., cities, streets, political bodies, parks, bodies of water, etc.) and presentation formats (e.g., satellite images, maps, photos of addresses, route building, and virtual tours). In order to improve the usability online maps for users, it is useful to know how users are using maps and how they are using maps differently in different regions. Because of the many features available to users and the significant amount usage of online maps—on the order of millions of map accesses every day—analysis of that usage requires extensive processing power and time. Methods of pre-processing the usage data to allow for more efficient analysis of the usage would make improvement of maps faster and easier.

SUMMARY OF THE INVENTION

Systems, methods and other embodiments process usage data from an online mapping service to determine the popularity of the various geographic areas among users of the online mapping service. In one embodiment, the processed usage data is displayed to users as a heatmap data layer overlaying the map. Maps are divided into map portions for storage in a geographic database. The maps are displayed to users of the online mapping service as images on map tiles. Map portions are scored based on the determined popularity of the geographic areas. In one embodiment, the map portions and scores are associated with the map tiles encompassing those map portions. Optionally, only map portions having a certain size compared to the size of the map tile are stored as associated with the map tile. In a further option, scores for map portions larger and smaller than the stored map portion are aggregated with the scores for the stored map portions. Scores can be retrieved and displayed to users as an overlay on the map. In one embodiment, the overlay is a heatmap.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

System Overview

Figure 1:
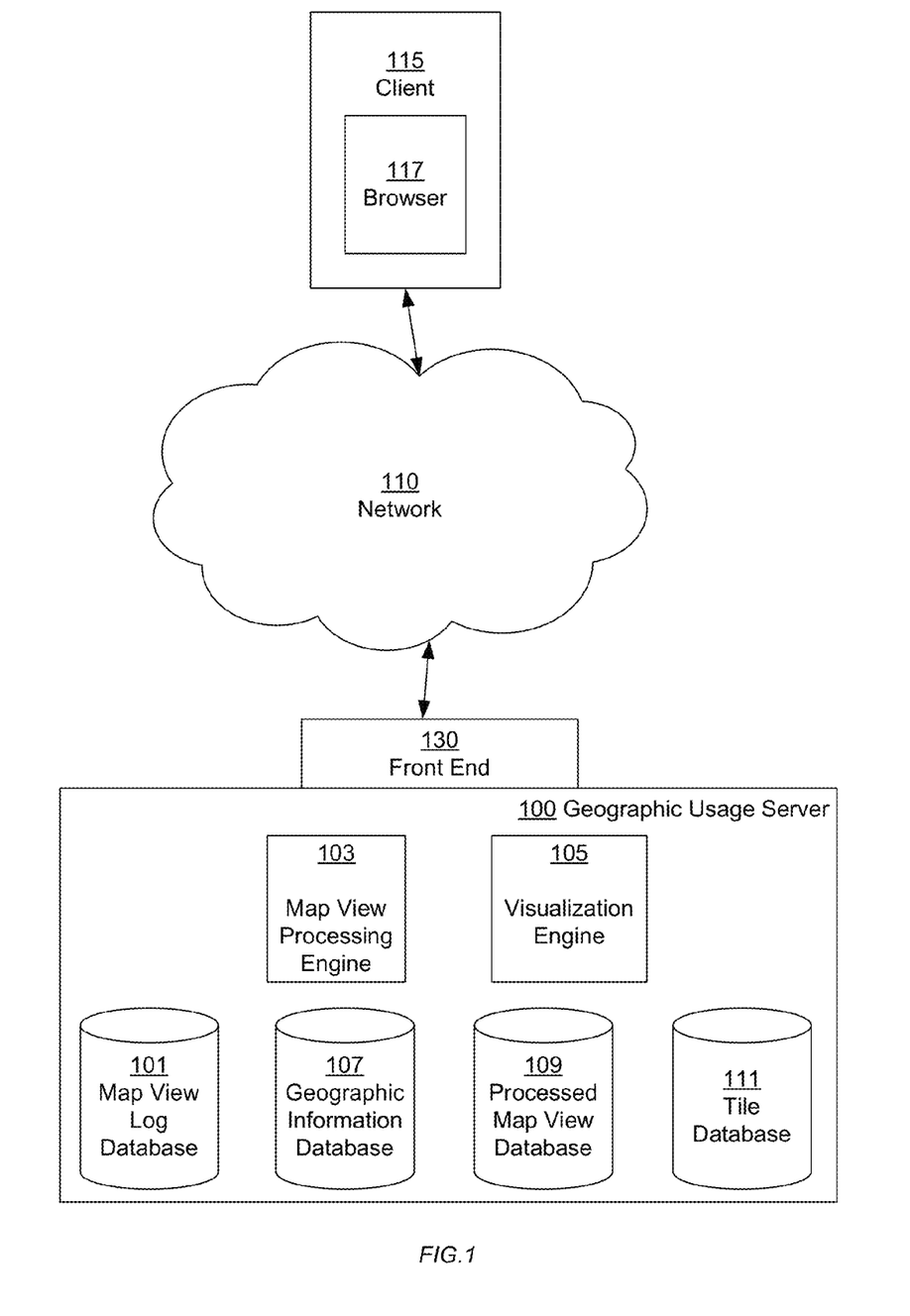
FIG. 1 is a diagram of system environment according to one embodiment.

FIG. 1 is a diagram of a system environment according to one embodiment. The geographic usage server 100 comprises a map view log database 101, a map view processing engine 103, a visualization engine 105, a geographic information database 107, a processed map view database 109 and a tile database 111. For simplicity, only one map view log database 101, one map view processing engine 103, one visualization engine 105, one geographic information database 107, one processed map view database 109 and one tile database 111 are shown, but in practice many of each of these may be in operation.

The geographic usage server 100 communicates with a client 115 via its front end 130 and the network 110. The network 110 is typically the Internet, but may also be any network, including but not limited to a LAN, a MAN, a WAN, a mobile, wired or wireless network, telecommunication network, a private network, or a virtual private network, and any combination thereof.

The client 115 is any type of device that is adapted to access the geographic usage server 100 over the network 110. Examples of clients include, but are not limited to, desktop computers as well as mobile devices such as a handheld computer, laptop computer, tablet computer, mobile phone or personal digital assistant (PDA) and devices that receive map information which have been adapted to provide the structures and functions described herein. Most basically, a client 115 is configured with a client application for displaying maps and map usage information received from the geographic usage server 100. In one embodiment the client application is a browser 117. The browser 117 is any browser known in the art. Alternatively, the client application is a dedicated map application. For simplicity only one client 115 is shown. In practice, very large numbers (e.g., millions) of clients 115, or as many as can be supported by the hardware and software implementation, can be in communication with the geographic usage server 100 at any time.

The geographic usage server 100 is implemented as server program executing on one or more server-class computers comprising a CPU, memory, network interface, peripheral interfaces, and other well known components. The computers themselves preferably run an open-source operating system such as LINUX, have generally high performance CPUs, with 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media), or by equivalent implementations in hardware and/or firmware.

Figure 2:
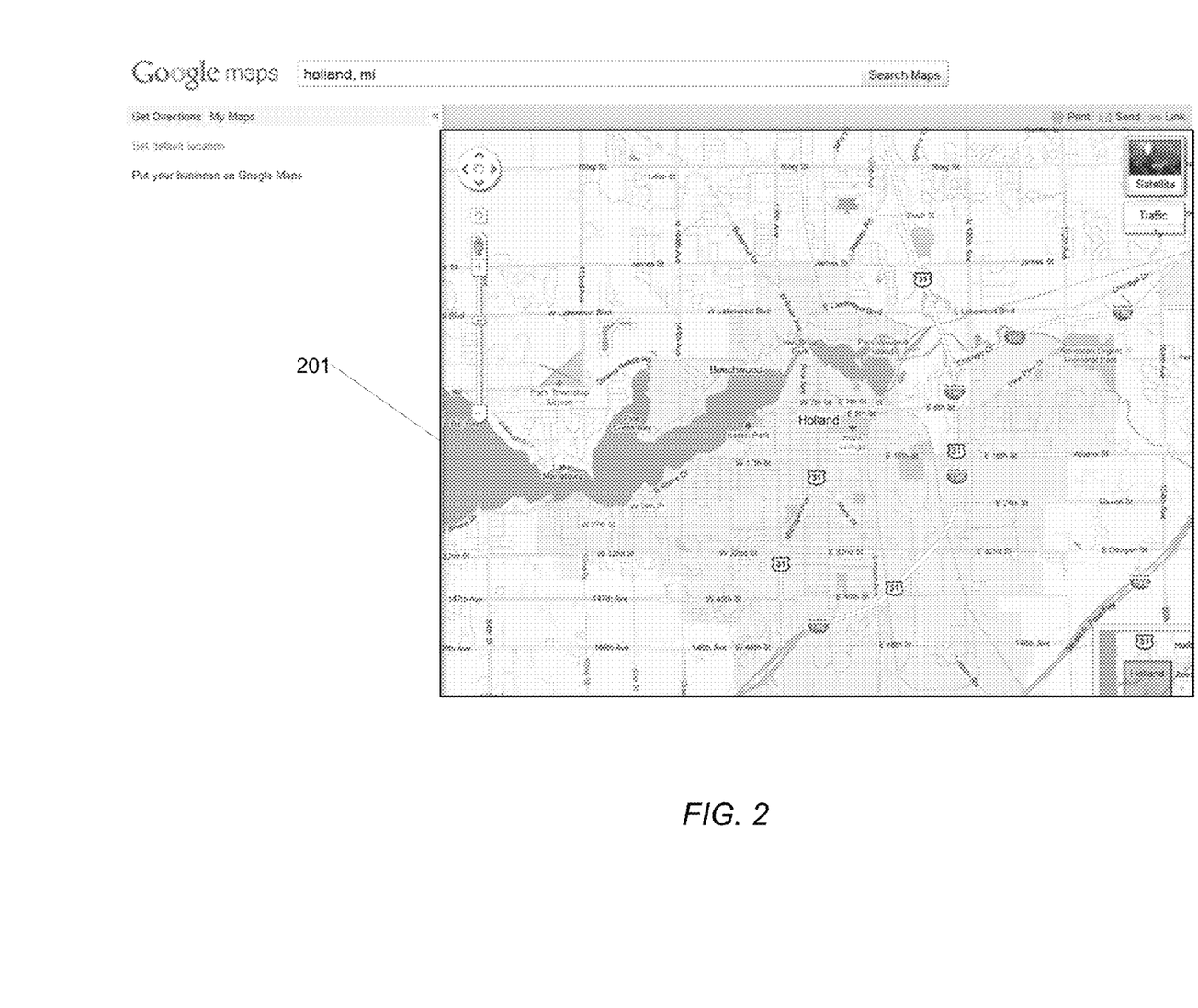
FIG. 2 is a screenshot of a viewing window of a map according to one embodiment.

The map view log database 101 stores data for interactions by users with an online map service. Online map services include, for example GOOGLE™ MAPS. Each log entry includes the viewing window of a map viewed by the user, an IP address of the client device interacting with the online map service, timestamp information, the user's ID if the online map service offers accounts for users, the type of interaction by the user with the online map service and other metadata. The map displayed to the user at the client device is in the viewing window. FIG. 2 is a screenshot of an online map program open in a browser 117 at a client 115 with the map displayed in viewing window 201. The viewing window 201 is stored in the log entry by the coordinates that bound it, for example the latitude and longitude coordinates of the upper right and lower left corners of the viewing window (or the upper left and lower right corners), or an equivalent geocoding. The type of interaction is what the user did at the online map service. Types of interactions include, zooming in on a feature, clicking on a feature to see attributes of the feature, viewing a satellite image of the map, requesting route information, taking a virtual tour of a route, opening a street view image, and the like.

The map view processing engine 103 processes the log entries from the map view log database 101 to determine the popularity of the plurality of geographic areas of the map based on how often each geographic area is viewed, accessed, or interacted with, across the plurality of users/clients. In one embodiment, the log entries are in the form loglisting_annotated=(clusterdocid→LocalListing=listing_merged+attribute annotations). The loglisting_annotated is the log entry that includes local listing data (where local listings are map features) and log-specified information which includes the viewing window defined by its bounding coordinates and information about the user such as IP address, country of access. The clusterdocid is a unique identifier for the LocalListing which is a data set of attributes for the map feature that is the local listing. Listing_merged and attribute_annotations are parts of the local listing. The map view processing engine 103 stores the processed map view data in the processed map view database 109. The operation of one embodiment of the map view processing engine 103 is described in reference to FIG. 4.

The visualization engine 105 provides visual representations, such as for example, a heat map, of usage data to a user at a client 115. The operation of one embodiment of the visualization engine is described in reference to FIGS. 7-10.

Figure 3A:
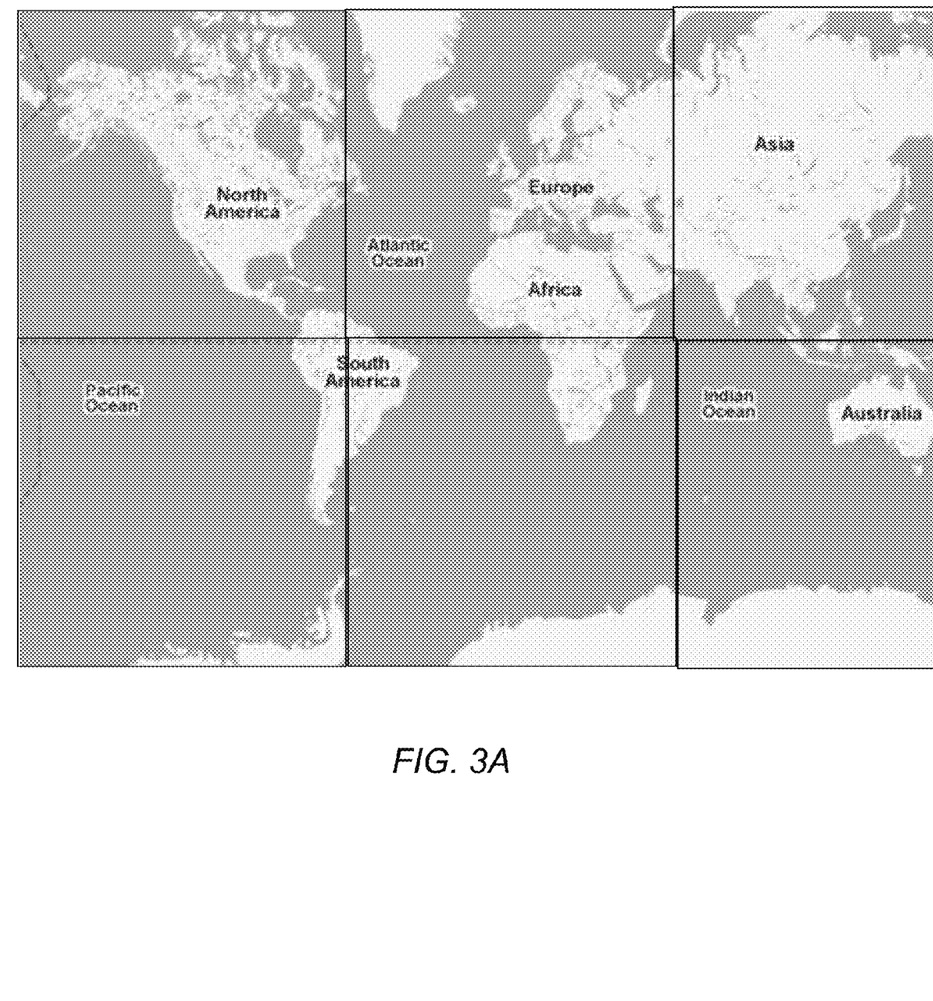
FIG. 3A illustrates a map of the Earth divided into six map portions.
Figure 3B:
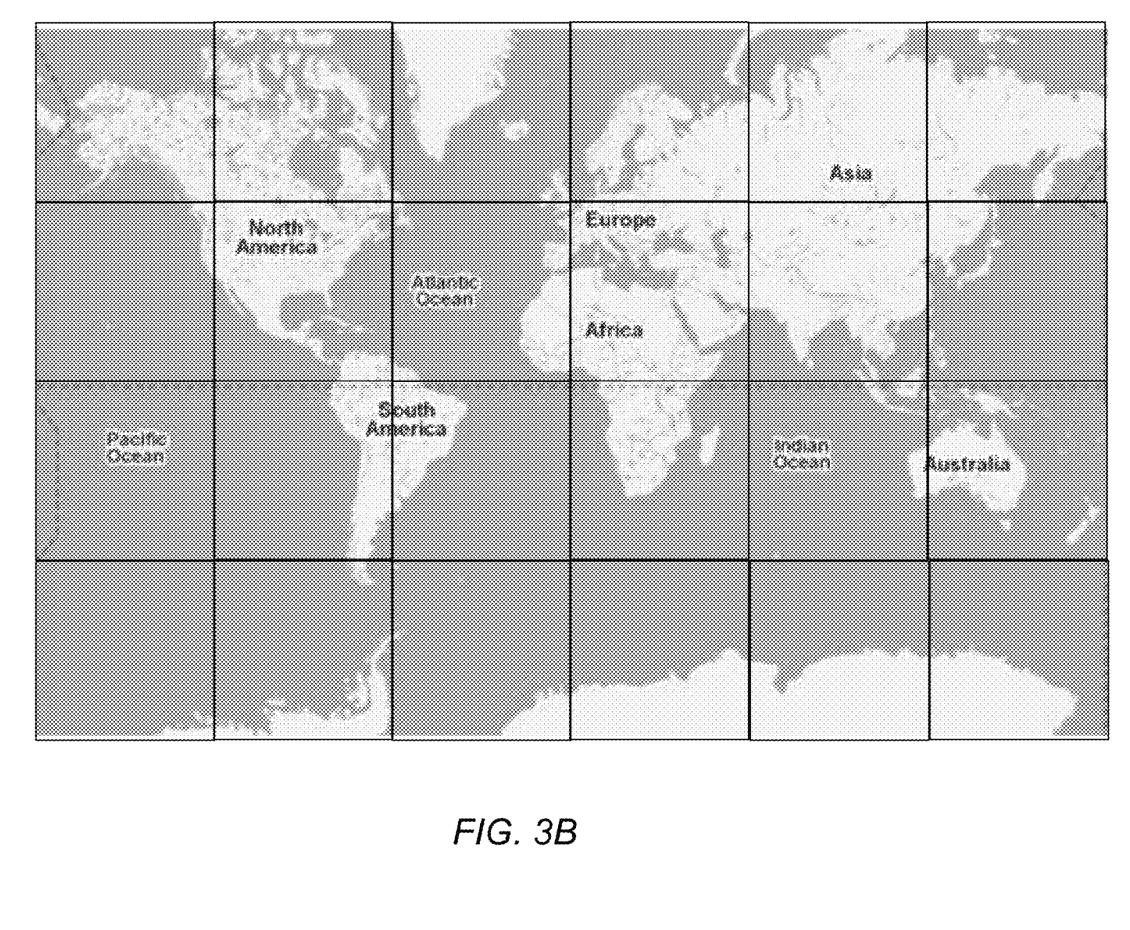
FIG. 3B illustrates a map of the Earth divided into 24 map portions.

The geographic information database 107 stores the online map. The online map is organized in map portions. Each map portion is square region of the map, and has a specific zoom level and bounding box (identified by the latitude and longitude of two of the diagonally opposite corners). At the lowest zoom level, level 1, the Earth is divided into the smallest number of map portions. In one embodiment, there are six square map portions at level 1 covering the entire surface of the Earth. FIG. 3A illustrates this level of zoom. At each subsequent zoom level, each map portion from the previous level is divided into four map portions. Thus at level 2, the Earth is divided into 24 map portions. FIG. 3B illustrates this level of zoom. This regular sub-division, whereby each map portion is sub-divided into four smaller map portions is repeated for a predetermined number of levels, forming a hierarchy of map portions. In one embodiment there are 21 additional zoom levels resulting in approximately $2.64 \times 10^{13}$ map portions at level 22. At level 22, the map portions are approximately 4.4 $m^2$. The hierarchy of map portions is similar to a quad-tree arrangement.

The data for a map portion further includes the map features that are displayed in that map portion. A map feature is an entity that is associated with a geographic location (either a point or a region); the entity may be associated with the geographic location by being located there, either currently or at some point in the past. Examples of entities include, but are not limited to, points of interest (POI), bodies of water, mountains, forests, cities, addresses, streets, businesses, buildings, historic sites, historic events (e.g., the location of Custer's Last Stand, or Woodstock) and landmarks. Map features have attributes which are characteristics of the map feature that identify, locate, or describe the entity. Different types of map feature can have different sets of attributers. Attributes include, for example, the latitude and longitude of the map feature, the name of the map feature, the category of the map feature, a unique identifier for the map feature and the popularity of the map feature among users of the geographic information server 100.

The processed map view database 109 stores the map view data after processing by the map view processing engine 103.

The tile database 111 stores a plurality of map tiles which are used to render a view of the map. Map tiles are image files map features displayed at a given zoom level. Map tiles are created for multiple zoom levels using the information from map portions for those zoom levels. A map tile may use information from multiple map portions at the given zoom level. Alternatively, the area encompassed by a map tile is the same as that of a map portion.

Process Overview—Map View Data Processing

The map view processing engine 103 determines the popularity of various areas on the map by analyzing the map view windows displayed to users of the online mapping system, determining map portions that are included in those map view windows and determining a score for each map portion in a given map view window. For map portions displayed in a plurality of viewing windows (e.g., for many different users), the scores from each display are aggregated to give one score for each map portion. This analysis is repeated periodically to account for new views of the map, for example, daily or weekly. Scores that were determined previously for map portions can be included with the new usage data. Optionally, the older data is weighted to have less of an influence on the popularity. In this way, new trends in popularity are identified more easily. In one embodiment, the processed data is displayed as a heat map data layer overlaying a map tile of the area whose popularity was determined.

Figure 4:
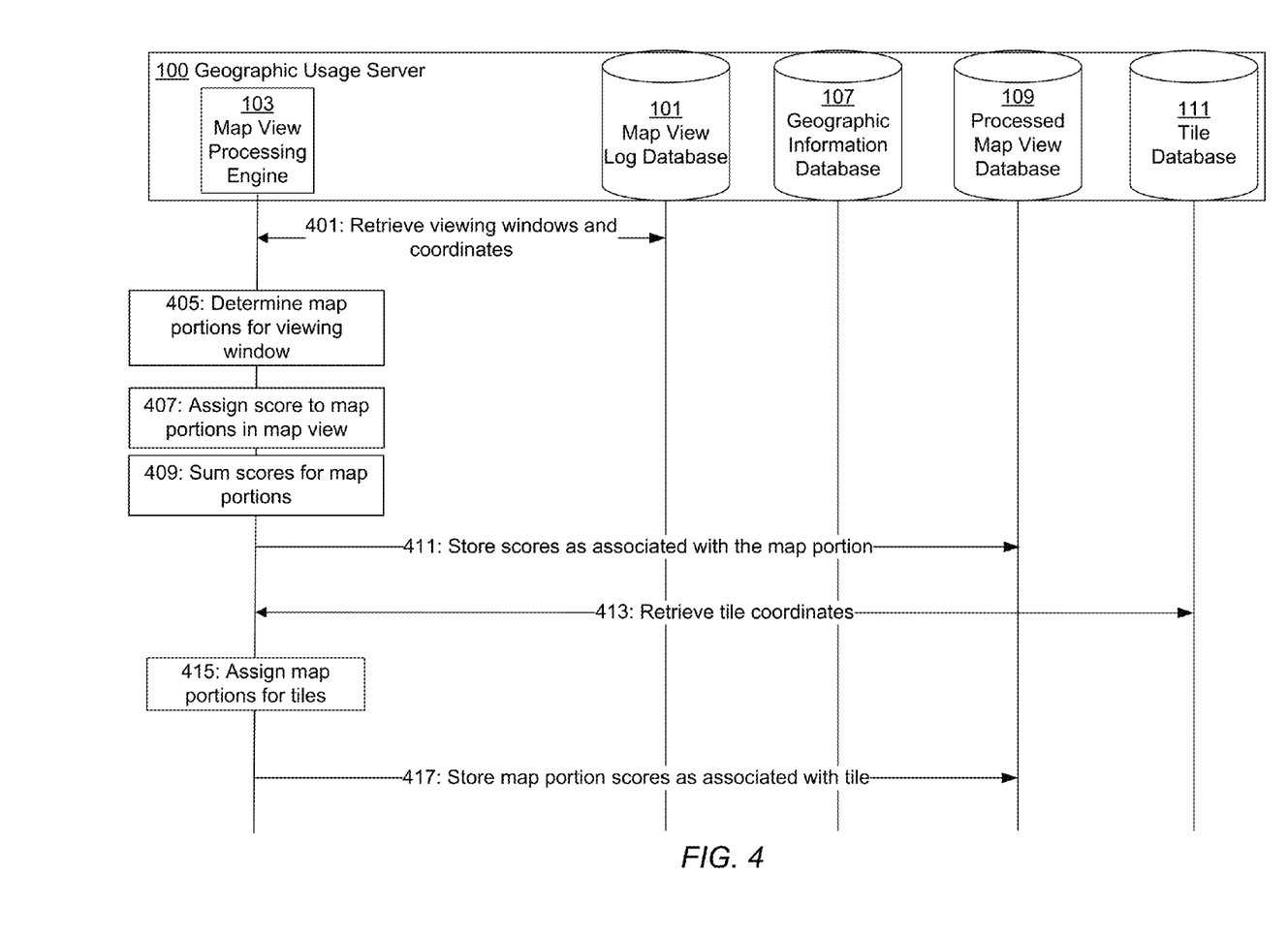
FIG. 4 is a data flow chart illustrating processing of map usage data according to one embodiment.

FIG. 4 is data flow chart illustrating processing of map view logs to create scores for the parts of an online map that indicate how often that part of the online map is displayed in a viewing window. The map view processing engine 103 retrieves 401 from map view log database 101 entries corresponding to viewing windows viewed during the time period being analyzed. In one embodiment, entries are retrieved for viewing windows viewed during the last week, last day or last hour. It is contemplated that very large numbers of viewing windows are analyzed by this method. The processing can be batched geographically as well. For example, the map view processing engine 103 could analyze popularity in areas of 10,000×10,000 meters at a time. Alternatively a given metropolitan area is analyzed—say New York City. The viewing windows are returned by the map view log database 101 along with the coordinates that define the viewing window.

For each window, the map view processing engine 103 determines 405 the map portions that fill the viewing window using a space filing algorithm. The map view processing engine 103 uses map portions from all available zoom levels and not just map portions having the same zoom level as the map shown in the viewing window.

Figure 5:
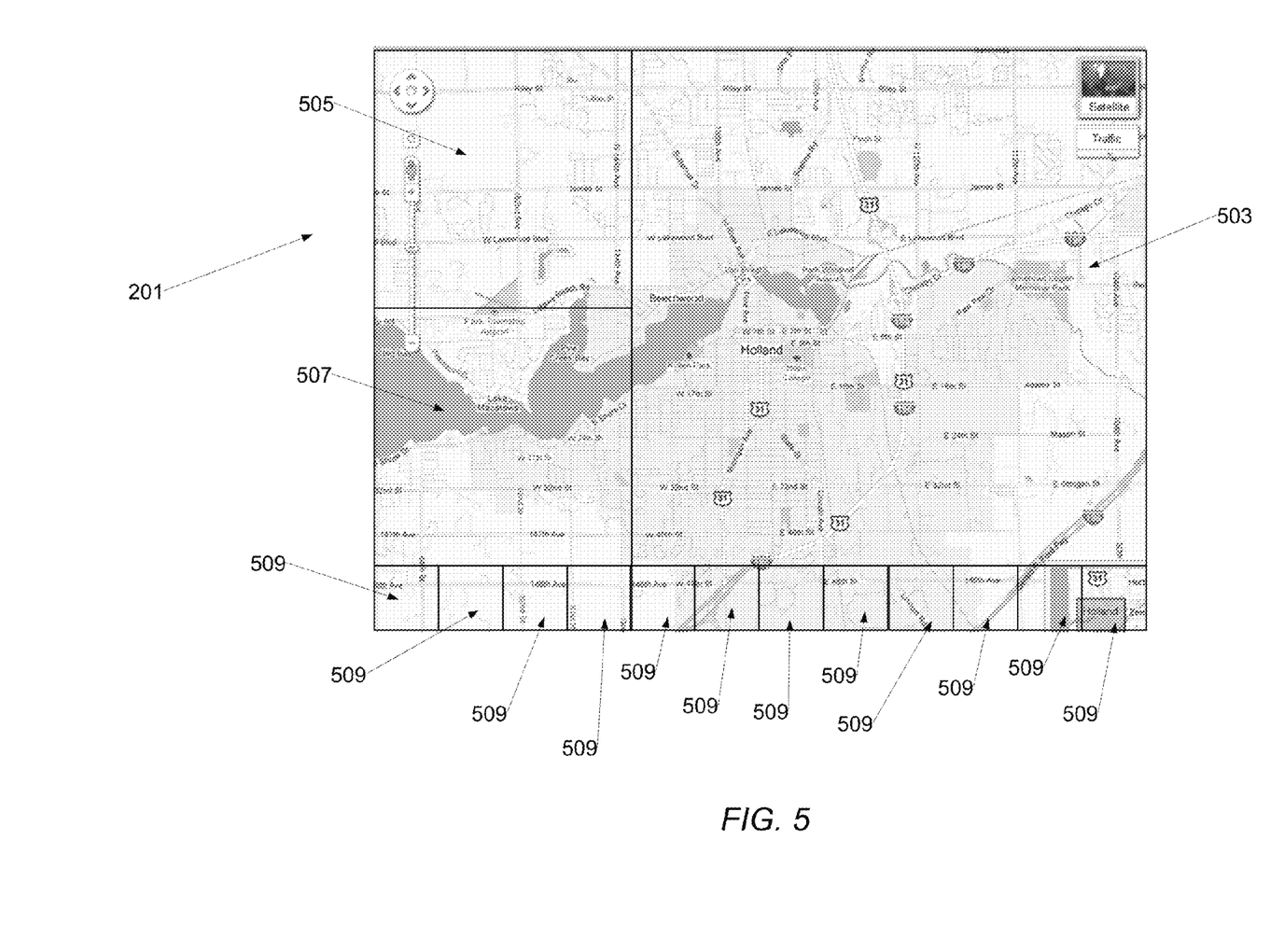
FIG. 5 is a screenshot illustrating determining map portions to fill a viewing window.

FIG. 5 illustrates the result of the map portions filling a viewing window. Map portions 503, 505, 507 and 509 are the map portions that fill viewing window 201. Map portion 503 is the largest map portion that fits inside the viewing window 201 leaving a portion of the viewing window unfilled. Map portions 505 and 507 fit the largest portion of viewing window 201 left unfilled by map portion 503. Then a small row of map portions 509 fill the last portion of the viewing window 201 left uncovered. This procedure of determining 405 map portions in viewing windows is repeated for each of the retrieved viewing windows. In FIG. 5, the smallest map portions 509 are 1/108 the size of the viewing window 201. In an alternate embodiment, the space filling algorithm uses only map portions that are 1/64 the size of the viewing window 201 or larger.

Once the map portions for a given viewing window are determined, they are assigned 407 a score. More specifically for each map portion, a score is maintained and is added to for each viewing window that is covered by that map portion. In one embodiment, each viewing window has a unit value (e.g., 1), and that unit value is allocated on a weighted basis across all of the map portions used to cover the viewing window 201. In the example shown in FIG. 5, map portions 509 are the smallest portions and are each assigned 1/108 of the unit value as they each cover 1/108 of the viewing window 201. Map portions 505 and 507 are assigned 4/27 of the unit value. The larger map portion 503 is assigned 16/27 of unit value, the remainder of the unit value for this viewing window.

Division of points across the map portions can be determined with an equation which is useful when the filling of the viewing window with map portions results in map portions of multiple sizes. The equation uses the zoom level of the map portion. The score, S, for each map portion, i:

$$S_i = S_{min} \times 2^{((zoom_{min} - zoom_i) \times 2)}$$

where $S_{min}$ is the score assigned to the smallest map portion among the map portions that fit in the viewing window. The portion of the viewing window covered by one of the smallest map portions is calculated. As an example, using the foregoing scoring equation, $S_{min}$ is 1/108. $Zoom_{min}$ is the zoom level for the smallest map portion and $zoom_i$ is the zoom level for the map portion whose score is being calculated. The zoom level of the map portions is part of the information retrieved with the map portions from the geographic information database 107. In the example in FIG. 5, the smallest map portions 509 are three zoom levels higher (more zoomed in and thus the map portion is smaller), x+3, than larger map portion 503, x. The relationship between the zoom levels of the map portions is known because map portions 509 are one sixty-fourth the size of map portion 503. The computation for the score for map portion 503 is:

$$S_{503} = \frac{1}{108} \times 2^{(((x+3)-x) \times 2)} = \frac{16}{27}.$$

As is apparent, over time a map portion will be displayed in multiple viewing windows for many different viewers, and this information will appear in the map logs. Accordingly, the map portion's score from each of those viewing windows is summed 409 to determine a total score for the map portion. The result is that each map portion has a score that represents the overall amount of presentations of that map portion to the population of users of the map system Those map portions with the highest scores can be considered the most popular. The overall set of score map portions is referred to herein as the popularity scored map portion data. The score for each map portion is stored 411 as associated with the map portion in the processed map view database 109.

The popularity scored map portion data can be used and visually presented in a variety of different ways. While it is anticipated that certain map portions will be very popular—such as those associated with metropolitan area, tourist sites, etc.—the foregoing approach allows for the identification and discovery of map portions—and hence underlying geographic features—that are unexpectedly popular. For example, the popularity scored map portion data can reveal geographic areas and geographic features that become very popular very quickly, following a newsworthy event, such as an earthquake or tornado in the geographic area covered by the map portions. Since the popularity scored map portion data can be processed on a repeated, short period (e.g., 12 or 24 hour) cycle, trends in the popularity data can be identified by measuring the rate of change in the popularity scores for each map portion. Map portions showing high rates of change in their scores, particularly if these scores are relatively low compared to traditionally very popular areas, indicate geographic areas that are of very current and significant interest to the population of users. In some instances, the increased activity as indicated by high rates of change can indicate the occurrence of important events even before such events are reported widely in the news media. This is because mapping systems are often used as primary tools for users planning or undertaking actions of interest in particular areas. A high rate of change of the map popularity score for a map portion, when weighted by the zoom level of the map portion (or inversely weighted by the map portion's size) can serve as a leading indicator of a newsworthy event.

There are many different possible visual representations of the popularity scored map portion data as well. In one embodiment, the popularity scored map portion data are presented to users as an overlay on map tiles, in the form of a heat map, using pixel color as an indicator of the score such as in FIG. 8.

In one embodiment, the scores for map portions are stored in association with the map tiles that encompass the map portions. This allows for data to be retrieved more quickly when requested by a user. The coordinates for map tiles are retrieved 413 and the map portions assigned 415 across the retrieved tiles. A tile is determined to encompass a map portion when the coordinate of the center of the map portion lies inside the coordinates of the map tile. Because multiple map tiles at different zoom levels encompass the same area on a map, a map portion and its score is assigned to all tiles that encompass that map portion. In one embodiment all map portions that are encompassed by a given map tile are stored as associated with that tile.

In an alternate embodiment, only those map portions whose size corresponds to a pixel on a given map tile are stored as associated with that tile. Some map tiles cover very large areas of land and for such tiles, a single pixel similarly covers a significant area—for example, 10 square kilometers for a map tile covering the entire state of New York. There are many additional map portions which are smaller than that single pixel-size map portion. Thus, avoiding the storage of all of the scores for all of those smaller map portions makes retrieval of the data more efficient. In such an embodiment, the data is processed according to the following additional procedure. For example, if the display resolution for map tiles is 256×256, the map portions that cover a pixel in that map tile are those map portions whose zoom level is 8 greater than the map tile's zoom level. More specifically given map portion at zoom level x, there are 256×256 map portions having zoom level x+8 that are covered by the map tile.

In one embodiment, data for map portions larger and smaller than the pixel-size map portions are combined with the data for the pixel size map portion. In this way, the amount of data stored is reduced but the scores for all map portions are still taken into account. In the example of a map tile where pixel-size map portions having a zoom level x+8, the scores for the x+8 map portions are combined with the data for the map portions at zoom levels above and below x+8.

Figure 6:
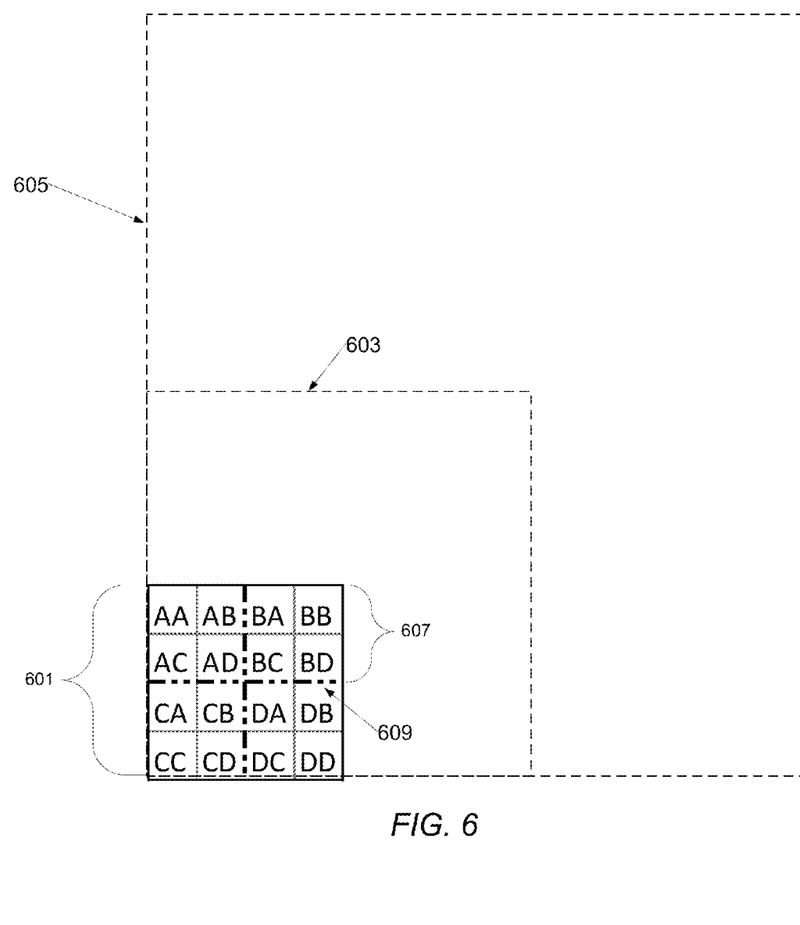
FIG. 6 illustrates overlapping map portions of various zoom levels.

Table 1 and FIG. 6 illustrate the combination of scores for two zoom levels above and below the example pixel size map portion, 601. The two map portions at zoom levels above the pixel size map portion are map portion 605 which has a zoom level of pixel−2 and map portion 603 which has a zoom level of pixel−1. There are four map portions 607 at one zoom level higher than 601. These have zoom level at pixel+1, 607A (made up of 609AA, 609AB, 609AC and 609AD), 607B (made up of 609BA, 609BB, 609BC and 609BD), 607C (made up of 609CA, 609CB, 609CC and 609CD) and 607D (made up of 609DA, 609DB, 609DC and 609DD). There are sixteen map portions, 609, at two zoom levels higher than 601 (pixel+2), 609AA, 609AB, 609AC, 609AD, 609BA, 609BB, 609BC, 609BD, 609CA, 609CB, 609CC, 609CD, 609DA, 609DB, 609DC and 609DD.

TABLE 1

| Map Portion | Map portion Score | Score to be added to 601 Score |
|---|---|---|
| 605 | 1224 | 1224/16 = 76.5 |
| 603 | 316 | 316/4 = 79 |
| 601 | 32 | 32 |
| 607 A | 45 | 45 |
| 607 B | 56 | 56 |
| 607 C | 89 | 89 |
| 607 D | 78 | 78 |
| 609 AA | 96 | 96 |
| 609 AB | 55 | 55 |
| 609 AC | 29 | 29 |
| 609 AD | 56 | 56 |
| 609 BA | 47 | 47 |
| 609 BB | 48 | 48 |
| 609 BC | 59 | 59 |
| 609 BD | 65 | 65 |
| 609 CA | 66 | 66 |
| 609 CB | 25 | 25 |
| 609 CC | 28 | 28 |
| 609 CD | 39 | 39 |
| 609 DA | 56 | 56 |
| 609 DB | 54 | 54 |
| 609 DC | 22 | 22 |
| 609 DD | 78 | 78 |
| Total Score for 601 | | 1278.5 |

Scores for the smaller map portions, 609AA, 609AB, 609AC, 609AD, 609BA, 609BB, 609BC, 609BD, 609CA, 609CB, 609CC, 609CD, 609DA, 609DB, 609DC and 609DD, are summed with the score for map portion 601.

The scores for map portions having zoom levels above that of map portion 601, map portions 603 and 605, are divided evenly across the map portions that are encompassed by the larger map portions. Map portion 603 is four times the size of 601 and has score 316. One fourth of the score for map portion 603, 316/4=79, is added to the score for 601. Map portion 605 is sixteen times the size of 601 and has score 1224. 1/16 of the score for map portion 605, 1224/16=76.5 is added to the score for 601.

Thus the final score for map portion 601 are the scores for the smaller map portions, 609AA, 609AB, 609AC, 609AD, 609BA, 609BB, 609BC, 609BD, 609CA, 609CB, 609CC, 609CD, 609DA, 609DB, 609DC and 609DD; the prorated scores for map portions 603 and 605 and map portion 601's own score. This gives a total of 1278.5.

The usage data for a given tile is keyed with the coordinates for the tile and the value is an array of pairs for each map portion (map portion, score) and stored 417 in the processed map view database 109.

Figure 7:
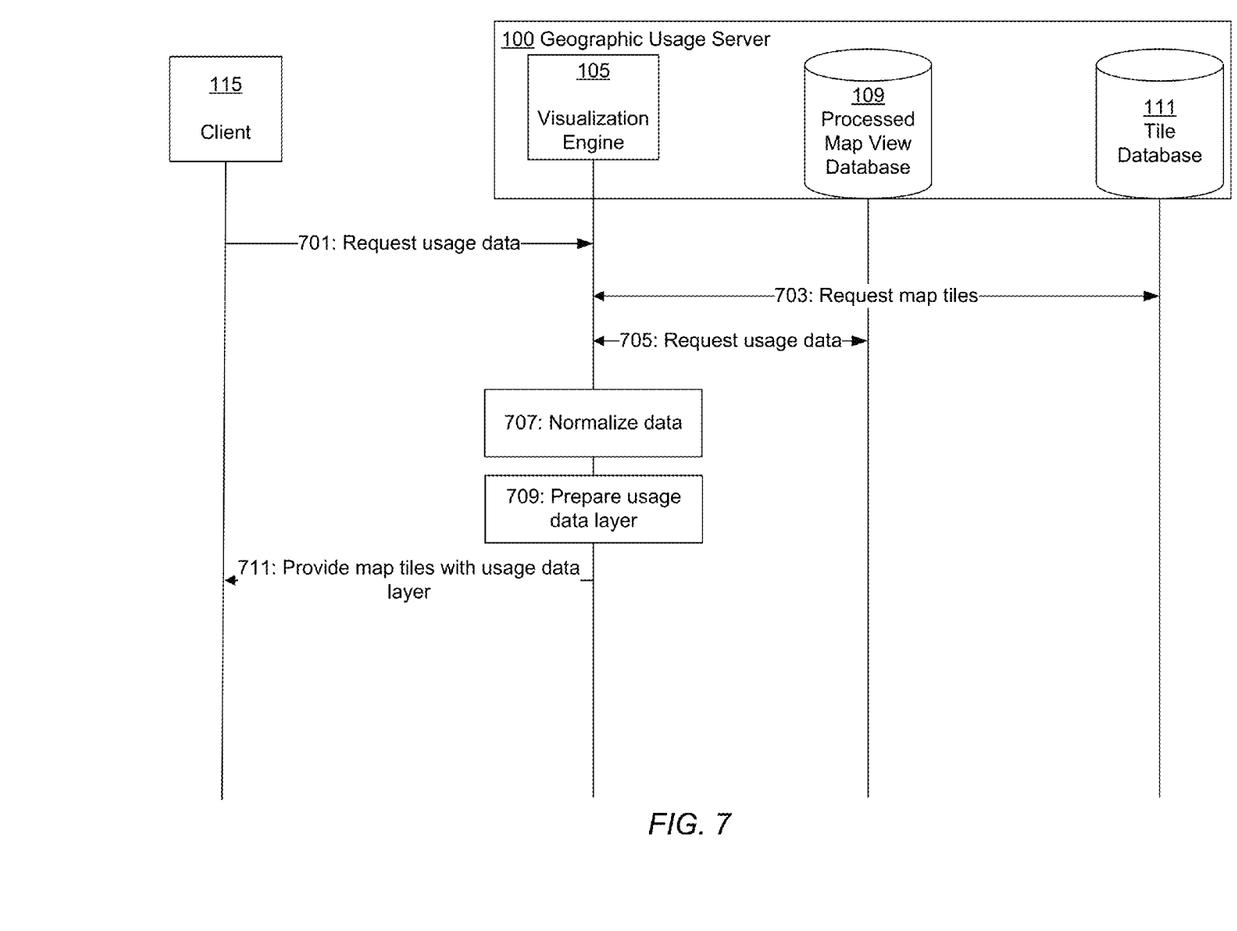
FIG. 7 is a data flow chart illustrating the method of presenting map usage data visually according to one embodiment.
Figure 8:
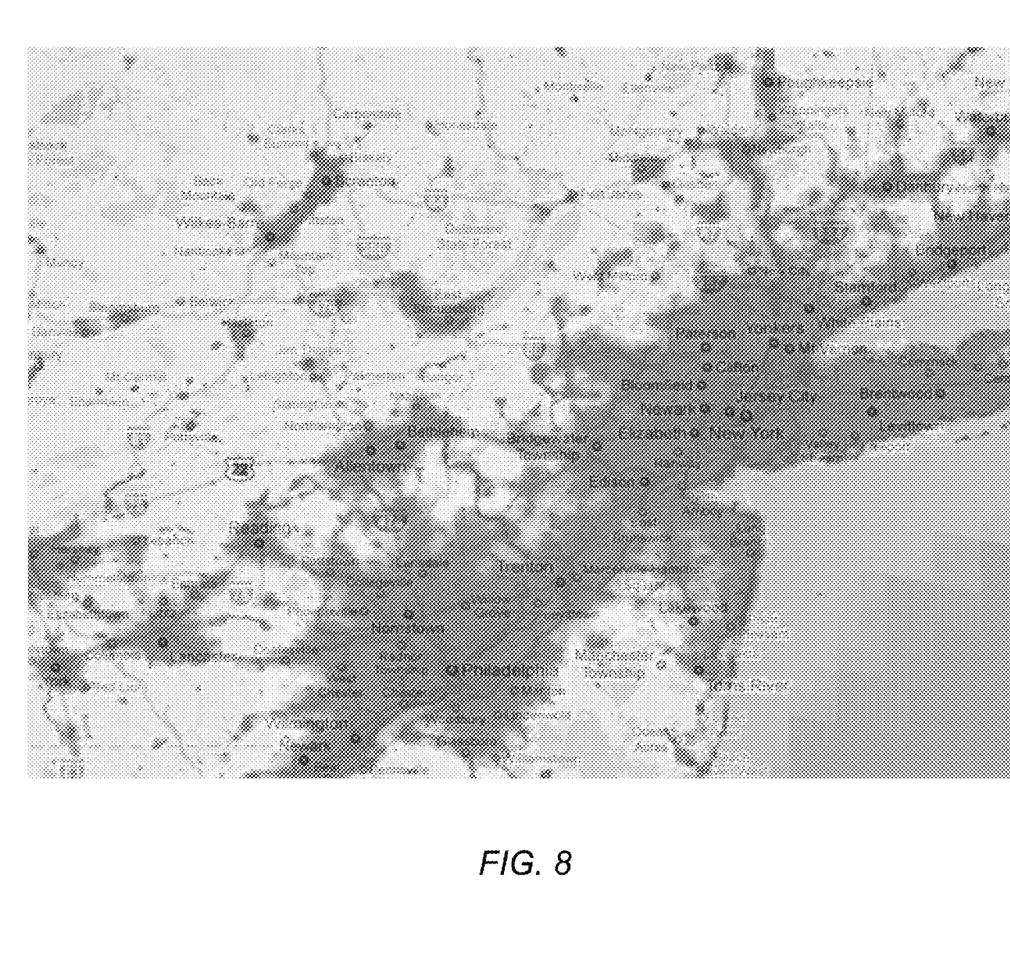
FIG. 8 is a screenshot of map usage displayed on the map according to one embodiment.

FIG. 7 illustrates operation for displaying of popularity scored map portion data to a user for an area of an online map. A user requests 701 usage data from a client device 115. The visualization engine 105 requests 703 map tiles for the requested area of the map from the tile database 111. The visualization engine 105 also requests 705 the usage data for the tiles to be displayed from the processed map view database 109. In one embodiment, the usage data is normalized 707. Normalization can be accomplished through any method known in the art such as scaling. The visualization engine 105 prepares 707 the normalized usage data into an overlay for the map tiles to be displayed. The visualization engine 105 then provides 709 the map tiles along with a usage data layer to be displayed over the map tiles. In one embodiment the data layer is a heat map. Display of the usage data layer does not preclude additional data layers to be displayed as well over the map tiles. FIG. 8 is a screenshot of a map with usage data shown as a heat map. The darker areas are those displayed more often and the lighter areas those displayed least often.

Figure 9:
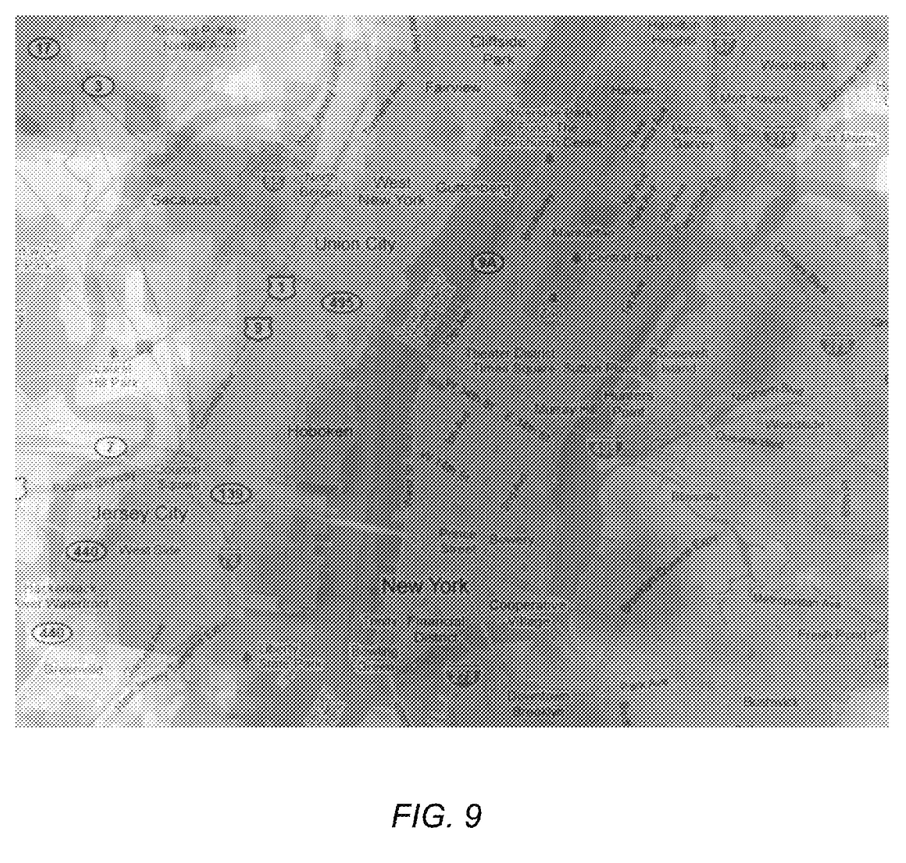
FIG. 9 is a screenshot of map usage displayed on the map according to one embodiment.
Figure 10:
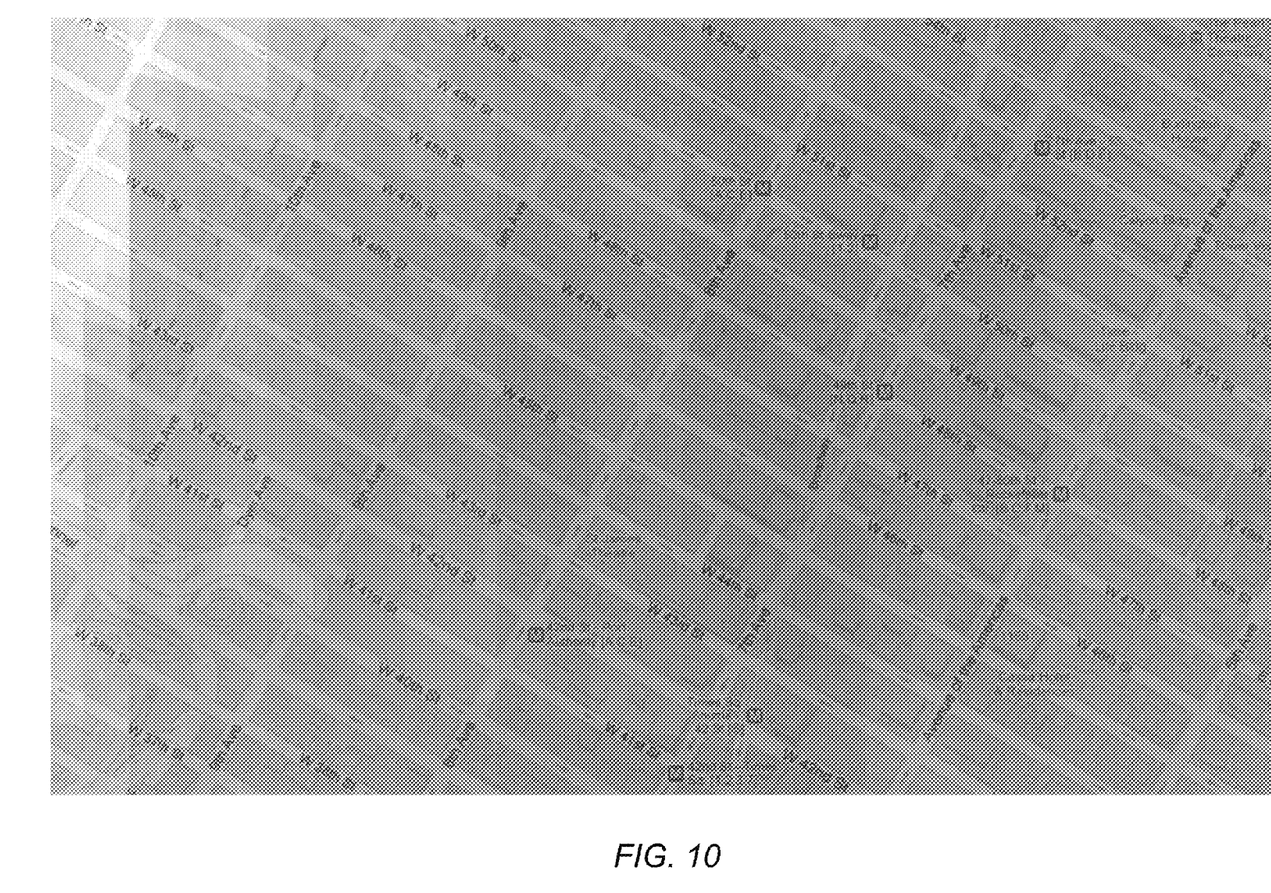
FIG. 10 is a screenshot of map usage displayed on the map according to one embodiment.

FIGS. 9 and 10 are more zoomed in views and demonstrate normalized data. On FIG. 8 all of Manhattan and the area immediately surrounding Manhattan are very popular and thus represented at about the same level of darkness. FIG. 9 is a more zoomed in view and uses more zoomed-in tiles. The area immediately surround Manhattan is now lighter than it was in FIG. 8 because relative to the other data displayed on this area of the map, these areas are the least displayed to users. FIG. 10 is more zoomed in still and now parts of Manhattan are lighter colored because, relative to the other portions the map displayed in FIG. 10, those parts of Manhattan are least displayed to users.

Additional Use Cases

The described methods can be used to provide data not just of overall viewing of maps but also usage of particular map functionality such as using street views or planning a route. For such a use, the records retrieved by the map view processing engine 103 are just those viewing windows for which a user used the particular feature of interest. The map view processing engine 103 then determines map portion scores and stores them as associated with map tiles for each functionality for which usage data is desirable.

In one embodiment, usage information of particular map functionalities allows the administrators of an online mapping system to determine the geographic areas for which functionalities should be improved or updated. For example, if it is determined that the street view functionality is especially popular in Holland, Mich., the administrators can update the streetview images more frequently there than in an area where street view is not as popular.

The usage information can also be used to tailor advertisements for the most popular areas of the map and most popular functionalities of the map.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer-implemented method comprising:
receiving a plurality of views of a map from a plurality of different presentations of the views to different users, the map comprising hierarchical map portions, each map portion having a first size and encompassing an area on the map, and the map having at least one parent node encompassing an area of the map that is larger than the first size;
determining a first map portion encompassed by the plurality of views of the map, the first map portion being one of the map portions having the first size and that is scaled to a first zoom level;
determining a second map portion having a second size scaled to a second zoom level; and
determining a score for the first map portion simultaneously with determining a score for the second map portion based at least on a number of the views of the map at the second zoom level that encompass the first map portion and the second map portion, and wherein the score is weighted based on an amount of each presented view the first map portion or the second map portion occupies.

2. The method of claim 1 wherein the map is displayed on map tiles and the method further comprising:
determining a map tile on which a part of the first map portion is displayed;
determining a number of pixels for the map tile, the pixels having a third size; and
responsive to the first size of the first map portion exceeding a first threshold and not exceeding a second threshold wherein the first threshold and the second threshold are based at least in part on the third size, storing the first score and the first map portion as associated with the map tile.

3. The method of claim 1 wherein determining a score for the first map portion and the second map portion comprises:
determining a size of the first map portion and a size of the second map portion, and scoring the first map portion and the second map portion based on a difference in size of the first map portion and the second map portion at the second zoom level.

4. The method of claim 3 wherein determining a score for the first map portion further comprises:
determining a third map portion whose encompassed area lies within the encompassed area of the first map portion; and wherein a score of the first map portion is based at least in part on the number of views of the map encompassing the first map portion that are scaled at the first zoom level, the number of views of the map encompassing the second map portion that are scaled at the second zoom level and a number of views of the map encompassing the third map portion that are scaled at a third zoom level, wherein the third zoom level is higher than the first zoom level.

5. The method of claim 1 wherein determining a score for the first map portion comprises:
determining a third map portion whose encompassed area lies within the encompassed area of the first map portion; and
wherein a score of the first map portion is based at least in part on a number of views of the map encompassing the first map portion that are scaled at the first zoom level and a number of views of the map encompassing the third map portion that are scaled at a third zoom level, wherein the third zoom level is higher than the first zoom level.

6. The method of claim 1 further comprising:
receiving a request for a map;
retrieving a first map tile corresponding to the requested map;
retrieving the scores associated with the first map tile;
rendering a heatmap from the retrieved scores; and
providing the first map tile and the heatmap for display.

7. The method of claim 6 further comprising:
retrieving a second map tile corresponding to the requested map;
retrieving the scores associated with the second map tile;
normalizing the scores associated with the first map tile and the scores associated with the second map tile; and
wherein:
rendering a heatmap comprises rendering a normalized heatmap from the normalized scores; and
providing the first map tile and the heatmap comprises providing the first map tile, the second map tile and the normalized heatmap.

8. A computer implemented system comprising:
a first module configured to:
receive a plurality of views of a map from a plurality of different presentations of the views to different users, the map comprising hierarchical map portions, each map portion having a first size and encompassing an area on the map, and the map having at least one parent node encompassing an area of the map that is larger than the first size;
determine a first map portion encompassed by the plurality of views of the map, the first map portion being one of the map portions having the first size and that is scaled to a first zoom level; and
determine a second map portion having a second size scaled to a second zoom level;
determine a score for the first map portion simultaneously with determining a score for the second map portion based at least on a number of the views of the map at the second zoom level that encompass the first map portion and the second map portion, and wherein the score is weighted based on an amount of each presented view the first map portion or the second map portion occupies.

9. The system of claim 8 wherein the map is displayed on map tiles and the first module is further configured to:
determine a map tile on which a part of the first map portion is displayed,
determine a number of pixels for the map tile, the pixels having a third size, and
responsive to the first size of the first map portion exceeding a first threshold and not exceeding a second threshold wherein the first threshold and the second threshold are based at least in part on the third size, store the score and the first map portion as associated with the map tile.

10. The system of claim 8 wherein the first module is further configured to:
determine a size of the first map portion and a size of the second map portion, and score the first map portion and the second map portion based on a difference in size of the first map portion and the second map portion at the second zoom level.

11. The system of claim 10 wherein the first module is further configured to:
determine a third map portion whose encompassed area lies within the encompassed area of the first map portion; and
wherein a score of the first map portion is based at least in part on the number of views of the map encompassing the first map portion that are scaled at the first zoom level, the number of views of the map encompassing the second map portion that are scaled at the second zoom level and a number of views of the map encompassing the third map portion that are scaled at a third zoom level, wherein the third zoom level is higher than the first zoom level.

12. The system of claim 8 wherein the first module is further configured to:
determine a third map portion whose encompassed area lies within the encompassed area of the first map portion; and
wherein a score of the first map portion is based at least in part on a number of views of the map encompassing the first map portion that are scaled at a first zoom level and a number of views of the map encompassing the third map portion that are scaled at a third zoom level, wherein the third zoom level is higher than the first zoom level.

13. The system of claim 9 further comprising a visualization module configured to receive a request for a map;
retrieve a first map tile corresponding to the requested map;
retrieve the scores associated with the first map tile;
render a heatmap from the retrieved scores; and
provide the first map tile and the heatmap for display.

14. The system of claim 13 wherein the visualization module is further configured to:
retrieve a second map tile corresponding to the requested map;
retrieve the scores associated with the second map tile;
normalize the scores associated with the first map tile and the scores associated with the second map tile; and
wherein:
rendering a heatmap comprises rendering a normalized heatmap from the normalized scores; and
providing the first map tile and the heatmap comprises providing the first map tile, the second map tile and the normalized heatmap.

* * * * *